US006324768B1

(12) United States Patent
Wellman

(10) Patent No.: US 6,324,768 B1
(45) Date of Patent: Dec. 4, 2001

(54) BALL LOCK PUNCH RETAINER AND CHECKING GAGE SYSTEM

(75) Inventor: Charles G. Wellman, Novi, MI (US)

(73) Assignee: AIP, Inc., Troy, MI (US)

( * ) Notice: Subject to any disclaimer, the term of this patent is extended or adjusted under 35 U.S.C. 154(b) by 0 days.

(21) Appl. No.: 09/551,264

(22) Filed: Apr. 18, 2000

(51) Int. Cl.[7] .............................. G01B 3/20; B23Q 17/22

(52) U.S. Cl. ........................... 33/501.05; 33/613; 33/627; 116/281

(58) Field of Search ............................ 33/501.05, 501.08, 33/501.45, 201, 613, 626, 627, 655, 642, 645; 116/230, 281, 283

(56) References Cited

U.S. PATENT DOCUMENTS 3,412,471 * 11/1968 Smith ..................................... 33/613
5,038,599 * 8/1991 Wellman ................................ 72/481
5,345,685 * 9/1994 Bloor .................................. 116/281
5,457,892 * 10/1995 Birschl .................................. 33/627
5,881,625 * 3/1999 Wellman ................................ 83/563
5,913,385 * 6/1999 Thibodeau .......................... 116/281

* cited by examiner

*Primary Examiner*—Andrew H. Hirshfeld
*Assistant Examiner*—Madeline Gonzalez
(74) *Attorney, Agent, or Firm*—Dinnin & Dunn

(57) ABSTRACT

A ball lock punch retainer system, including a punch, with a ball receiving grooved seat therein, a punch retainer body, a backing plate, a spring hole located in the retainer body, a ball positioned within said spring hole, a spring located in said spring hole, said spring generally acting to bias said ball into a locking engagement with said punch, an access hole located in the retainer body and communicating with the ball located in the spring hole, an elongated gage member which can be moved into and out of said access hole, one end of said gage member having a ball contact surface thereon, said gage member having a indicating area thereon with an upper end, a middle part, and a lower end, and the gage member being operative to determine when the ball lock is in proper position.

4 Claims, 2 Drawing Sheets

BALL LOCK PUNCH RETAINER AND CHECKING GAGE SYSTEM

BACKGROUND OF THE INVENTION

This invention broadly relates to a ball lock punch retainer system, which includes a new and unique checking gage for determining whether the ball lock is properly positioned.

The state-of-the-art for ball lock punch retainer products and systems is shown in earlier U.S. Pat. Nos. 5,181,438; and 5,881,625, the disclosures of which patents are incorporated herein by reference.

For approximately 40 years or longer there has been a significant problem in the field of ball lock punch retainers used in the tool and die industry. This problem involves improper location of the ball lock relative to the punch member, which is held within a punch retainer passage inside of the retainer body itself. On numerous prior occasions within the industry, which involve manufacture and usage of thousands and thousands of ball lock punch retainer products, if the ball lock was improperly positioned such that the lock was too high, or if the lock was too low, then serious problems would occur during actual manufacturing usage of the punch and retainer assembly in numerous different types of die stamping activities, i.e., where the punch members are used to form holes in various types of sheet metal or other metal objects which are being pierced by the punch to form holes or apertures in the metal.

For example, if the ball lock was improperly positioned to high, then there would be the possibility of a serious problem, wherein the punch might be pulled out of the retainer body during the stamping operation, which is very detrimental to proper usage of the punch and retainer assembly. In addition, if the ball lock was improperly positioned too low, then the punch would have a tendency to rotate on its axis, thereby losing the alignment for specially shaped points on the punch, which are used to form a specially shaped aperture or hole in the metal product being stamped. Also, if the ball lock was positioned too low this could cause a fracture of the ball member itself, which typically might cause a breakout of the retainer and a release of the punch member from the retainer body. While the above problems have been present in the art since the conception of the ball lock system, those skilled in the art have had little success in finding a solution to these problems.

Accordingly, it is an object of this invention to provide a new system wherein a ball lock punch retainer assembly can be operated or tested in conjunction with a gage member which will uniquely enable the user of the ball lock punch retainer to ascertain whether the ball lock itself is properly positioned.

Another object of the present invention is to provide a new and unique ball lock punch retainer/checking gage system.

Another object of the invention is to provide a new and unique checking gage, which can be utilized with a ball lock punch retainer system to determine if the ball lock is properly positioned.

Another object of the invention is to provide a novel method of using a specially designed gage member to determine whether a ball lock is properly positioned in a punch retainer system.

Another object of the invention is to provide a new method of using a gage member to ascertain whether the ball in a punch retainer system is too low, too high, or whether it is properly positioned.

Other objects, features and advantages of the present invention will become apparent to those skilled in the art once the subsequent description, drawings and claims have been reviewed.

SUMMARY OF THE INVENTION

A ball lock punch retainer system, including a punch, with a ball receiving grooved seat therein, a punch retainer body, a backing plate, a spring hole located in the retainer body, a ball positioned within said spring hole, a spring located in said spring hole, said spring generally acting to bias said ball into a locking engagement with said punch, an access hole located in the retainer body and communicating with the ball located in the spring hole, an elongated gage member which can be moved into and out of said access hole, one end of said gage member having a ball contact surface thereon, said gage member having an indicating area thereon with an upper end, a middle part, and a lower end, and the gage member being operative to determine when the ball lock is in proper position relative to the punch; and, the invention also includes a new and unique method of using a specially designed gage member to determine whether a ball lock is properly positioned in a punch retainer.

By the term "indicating area" as used herein it is meant an indicating surface area, or neck portion, or flat surface portion which is positioned on the gage member and can be used to gage or measure the positioning of the ball within the ball lock. The "indicating area" can be a flat surface, a painted surface, a groove, an etched surface, an embossed surface, or any other suitable form of predetermined marking or indicia placed on the gage member.

DESCRIPTION OF PREFERRED EMBODIMENTS AND BEST MODE OF CARRYING OUT THE INVENTION

Figure 1:
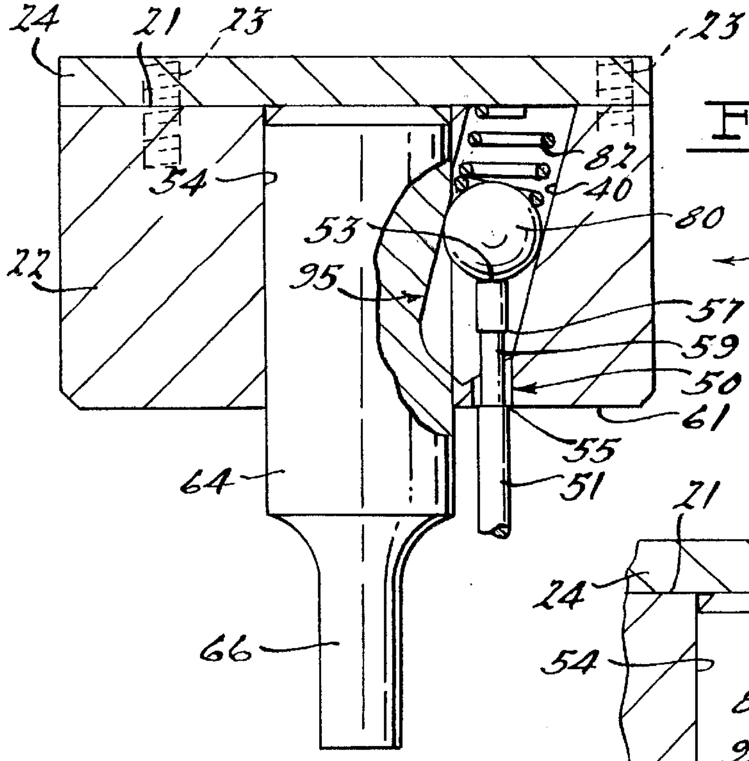
FIG. 1 is a partially cut-away perspective view of a ball lock punch retainer in accordance with the invention, where the ball lock is positioned on the high side but still within proper working limits.

Like numerals in different drawing FIGS. 1–5 indicate like structural elements.

This invention is applicable to typical punch and retainer systems (well known to those skilled in the art, e.g., see Wellman U.S. Pat. No. 5,181,438) wherein the punch retainer 20 has a top face 21 (see FIG. 1), and a retainer body 22 with integrally connected backing plate 24. The backing plate 24 is attached or fixed on the top face 21 by means of threaded fasteners 23 or any other suitable attachment means (known to those in the art). The punch retainer 20 is generally square or triangular in shape (or it can be of numerous other shapes known in the art). The top face 21 has a spring hole (see FIG. 1).

The ball lock punch retainer system shown in FIGS. 1 through 5, for purposes of ease of explanation, is shown basically the same in each drawing figure, with the exception that the ball lock is positioned at a different height or level in each of the five drawing figures. The punch 64 is shown held within the punch retaining passage 54 and when positioned within the retainer passage 54 the punch tip 66 shown in each of the figures is positioned and ready for downward movement such that when the punch is brought into contact with a metal stock, the punch tip 66 will form an aperture or hole of desired shape in the metal stock. The ball 80 is positioned within the spring hole 40 and the ball is biased in a downward or locking direction through use of the spring 82 which is also positioned within the spring hole 40. The ball 80 is biased by the spring 82 into a ball-retaining pocket or notch designated 95. When the ball 80 is so seated this causes the "ball lock" which holds the punch 64 in the retainer body 22.

There is also an access hole (i.e., lock release hole) 50 as shown in FIGS. I through 5, through which a gage member designated 51 can be inserted into the bottom portion of the spring hole 40.

The unique and novel function of the gage member 51 is now to be described. The gage member 51 will be specifically described, first, with respect to FIG. 2. Gage member 51 can generally be of any suitable shape or construction, however, it should be of appropriate longitudinal length and of generally cylindrical cross-section (although it could be of numerous other cross-sections such as square, triangular, etc.), such that it can be inserted into an access hole 50 to make contact with the ball 80 at the point 53. This is referred to as the first point of contact or first touch surface 53. Gage member 51 also comprises a first shoulder portion 55 and a second shoulder portion 57 with the cylindrical area or annular surface therebetween being referred to as the indicating area 59. The indicating area 59 can be coated with various different colors, if desired, or indicating area 59 could be cross-hatched (or embossed, or laser etched, etc.), or it could be simply black in color, depending on the particular desires of the user of this invention, as will be further explained herein.

Indicating area 59 can also be of numerous different lengths, however, broadly stated the indicating area 59 should be of a length from about 1/32 of an inch up to 2½ inches, depending on the size and dimensions of the ball lock construction being used in the ball lock punch retainer system. Normally the indicating area would have a length within the preferred range of about 3/32 inch to about ¾ inch; and best results are normally obtained when it is between about 3/16 inch to ½ inch. As a best mode preferred embodiment, for a 12 millimeter ball used for the ball lock, the indicating area 59 would be 7/32 inch in length; and the dimension from point 55 to point 57 on the gage member 51 is also 7/32 inch. The entire length of the gage member 51 itself is anywhere from about 1" to about 6", i.e., the overall or entire length is not particularly critical, so long as it is of sufficient overall length to be gripped in the fingers of the operator's hand (or to he held by a robotic member).

Figure 2:
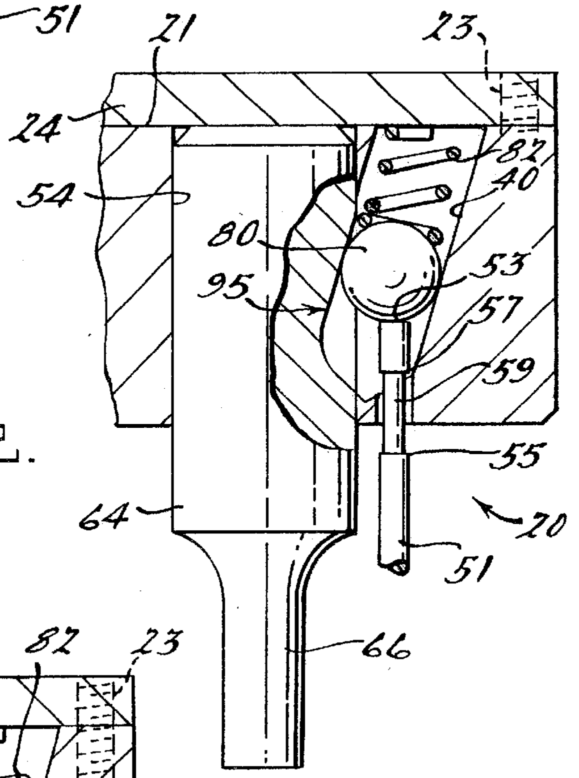
FIG. 2 is a partially cut-away perspective view of a ball lock punch retainer in accordance with the invention, where the ball lock is properly positioned and well within working limits.

In FIG. 2, the ball lock formed by the ball 80 is at a proper position and well within limits to form a good lock between the ball 80 and the punch 64. This proper position is tested or determined by the gage member 51, wherein the indicating area 59 on the gage member 51 is positioned such that the indicating area is approximately equidistantly positioned relative to the lower point or surface 61 on the retainer body 22, i.e., the line formed by surface 61 is the reference measuring point (or indicating line) relative to the position of the indicating area 59 when first touch contact is made between the gage member and ball at point 53. The indicating area 59, which extends from the point designated 55 to the point designated 57, has a portion thereof clearly visible beneath the reference surface 61 as shown in FIG. 2. This position of the gage 51 demonstrates good and proper positioning of the ball lock relative to the punch 64 and retainer body 22.

FIG. 1 indicates a positioning for the ball lock wherein the indicating area 59 is almost fully inserted within the access hole 50; but the lower shoulder 55 on the indicating area 59 is still just barely visible and is even with the surface 61. This illustrates a somewhat high position for the ball lock, but is still within proper and acceptable working limits.

Figure 3:
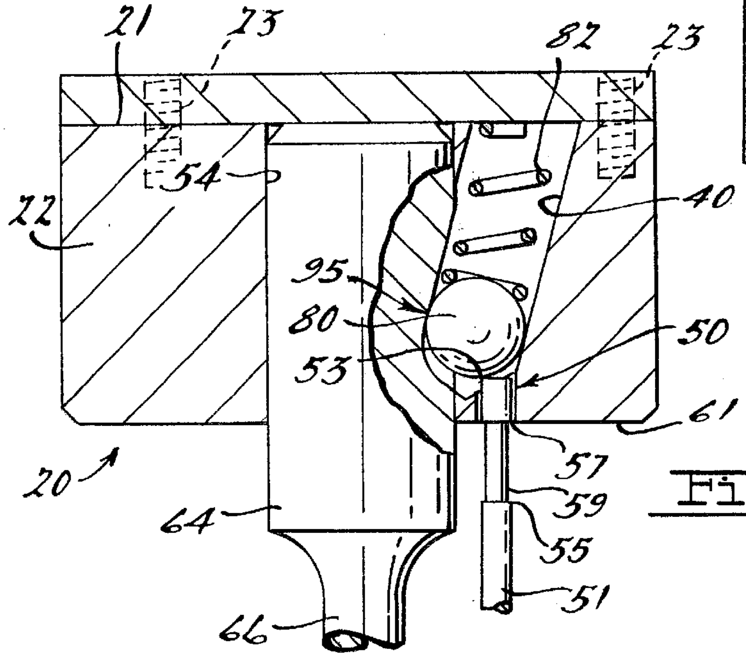
FIG. 3 is a partially cut-away perspective view of a ball lock punch retainer in accordance with the invention, where the ball lock is positioned on the low side but still within working limits.

In FIG. 3 the position of the ball lock formed between the ball 80 and the punch 64 is at a lower position when first touch is made at point 53, but still within proper working limits; and, this position is shown by the indicating area 59 of the gage member wherein the upper shoulder 57 is positioned even with the surface 61 and approximately the whole surface area of the next indicating area 59 (between 55 and 57) is visible.

The best position of the ball lock is indicated when the mid-portion of the neck 59 is clearly visible at the lower reference surface 61 of the retainer body 22, for example as shown in FIG. 2, when first touch of the gage 51 is made at point 53.

Figure 4:
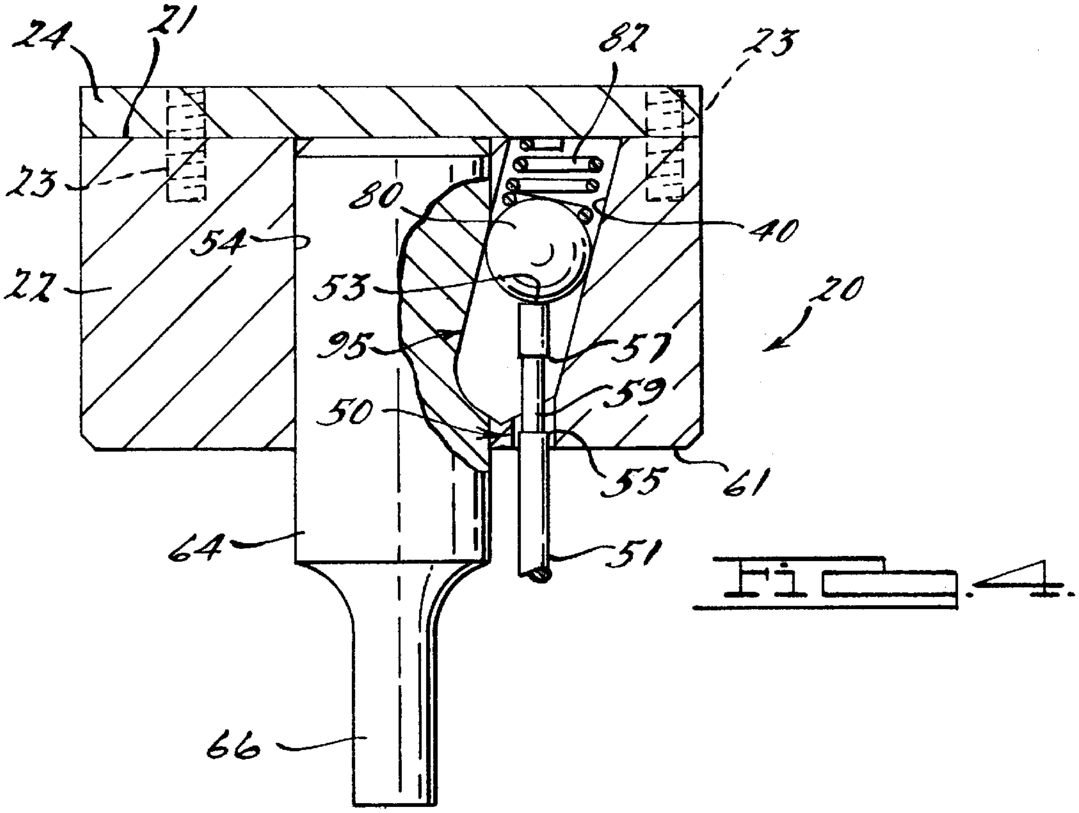
FIG. 4 is a partially cut-away perspective view of a ball lock punch retainer in accordance with the invention, where the ball lock is improperly positioned too high.

In FIG. 4, there is presented a situation wherein the gage member 51 (when making first touch to the ball 80 at point 53) indicates that the positioning of the ball lock formed between the ball 80 and the punch 64 is positioned too high; and serious problems could result therefrom. For example, in FIG. 4 the lower shoulder portion 55 on the gage member 51 is not visible and is positioned within the access hole 50 and above the reference surface 61. This positioning of the gage member 51 indicates that the ball lock is too high; and, the problems which would occur are: that the punch will pull out of the retainer body during the stamping operation, and/or it could contribute to a collapse of the spring member. There are no advance symptoms to predict this type of "High Lock" situation, other than a catastrophic discovery of same, after the actual stamping operation has begun, and resulting in broken punches/dies causing very expensive downtime (also, pieces of metal stock could be destroyed and/or wasted). Once this type of situation "High Lock" is ascertained, through use of the inventive gage member 51 herein, possible solutions are as follows: a jig grinding operation could be performed to correct the angle hole in the retainer body; and this is the preferred technique of remedying the situation where the ball lock is too high. Alternatively, a portion of the shank of the punch could be grinded off or machined off the end of the punch which seats against the backing member 24.

Figure 5:
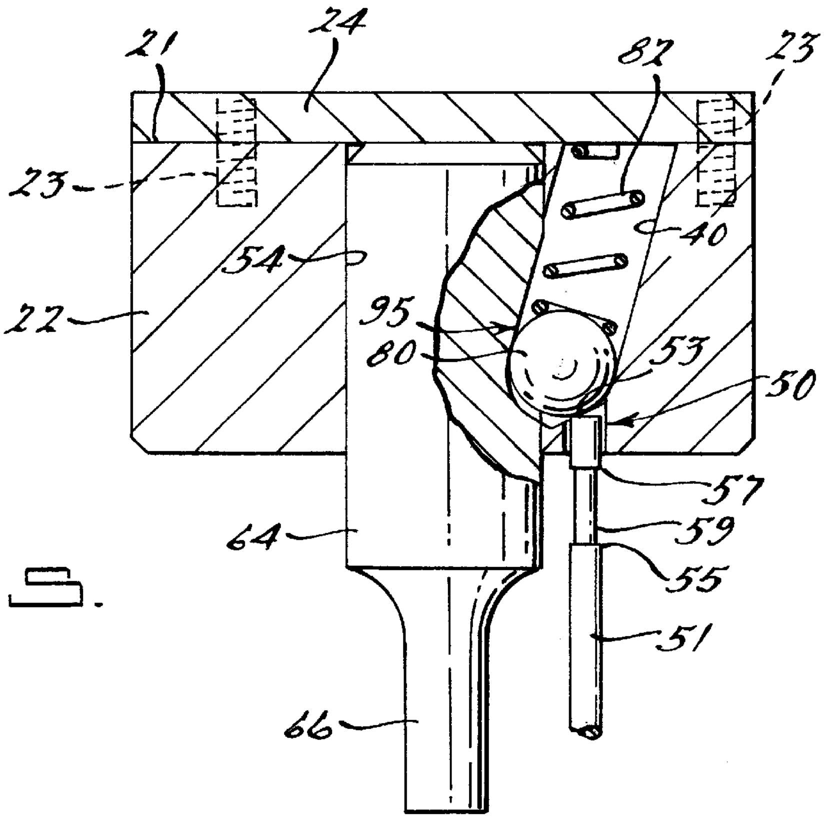
FIG. 5 is a partially cut-away perspective view of a ball lock punch retainer in accordance with the invention, where the ball lock is positioned too low and outside of proper working limits.

In FIG. 5, the situation is demonstrated where the ball lock is too low. This situation where the ball lock is too low is indicated through use of the gage member 51 being inserted into the access hole 50 until first contact or first touch is made with the ball 80 at point 53, as shown in FIG. 5. Once the gage member is at that position of first touch, it is seen in FIG. 5 that the shoulder or reference point 57 on the gage member 51 is clearly visible outside of the access hole 50 and slightly below the surface 61. This positioning of the gage member 51 indicates that the ball lock is too low (referred to as "Low Lock") and outside of proper and sufficient working limits for the punch/retainer system.

Problems which occur when the ball lock is too low are as follows: the punch can rotate on its axis thereby losing alignment for the specially shaped points on the end of the punch 66. Also, Low Lock can cause a fracture of the ball 80, and a breakout from the retainer at the release hole. Symptoms of Low Lock are that: the punch member 64 will pump in and out of the retainer when the ball lock is too low, and this can cause serious problems in usage of the punch member. Still further, the punch may be rotated by hand when the ball lock is too low. The solution to this Low Lock situation [where the ball lock is too low and outside of proper limits] is generally as follows: a portion of the retainer can be ground off (surface 21) such that the ball sits higher within the retainer body than as shown in FIG. 5.

Because the angle of the ball-seat (95) is of a lesser angle off the vertical plane than the ball hole (40), a wedge angle is formed (equal to the difference between the angles) that locks the ball into a position between surfaces 61 and 21.

Because slight deviations in the positions of ball-seat (95) in the punch and the ball hole in the retainer dramatically change the vertical position of the ball, tolerances must be held relatively accurately.

Up until now gages have been designed and manufactured by each producer of punch and retainer manufacturers to individually check either the ball-seat (95) position or the ball hole (40) position individually, but never to functionally check the resulting lock that occurs from the related positions of the ball-seat (95) and the ball hole (40), when they are locked together.

In prior punch retainers, for example shown in Wallis U.S. Pat. No. 4,558,620, a small threaded tool member (designated 48 in Wallis) has been used and inserted through a threaded aperture in Wallis' retainer body, at the bottom thereof, to move the roll into an upward position, but this mechanism in the Wallis patent is only used to dislodge the roll member into an upward position to release the roll lock from the punch member itself. There is no gage system disclosed or suggested in Wallis, and no technique taught in Wallis, for gaging the proper location and positioning of the roll lock relative to the punch.

The significant and unique advantages of the present invention will be easily recognized by those skilled in the art. The invention herein provides a simple, economical and easy way of measuring the proper location of a ball lock in a punch-retainer system through the use of a small gage member 51.

The novel punch/retainer/gage system of this invention is highly useful with respect to the following punch and retainer systems. For example, it is usable on light duty (inch) punch and retainer systems which have a ball diameter of either ¼ inch, 5⁄16 of an inch, or ⅜ of an inch. It is also usable on heavy duty (inch) punch and retainer systems which have a ball diameter of ⅜ of an inch, and/or ½ inch. It is also usable on light duty metric punch and retainer systems, which have a ball diameter of 6 millimeters, or 8 millimeters; and, it is usable on heavy duty metric system punch and retainer systems which have a ball diameter of 10 millimeters, and/or 12 millimeters.

While it will be apparent that the preferred embodiments of the invention disclosed are well calculated to fulfill the objects, benefits, and/or advantages of the invention, it will be appreciated that the invention is susceptible to modification, variation and change without the parting from the proper scope of fair meaning of the subjoined claims.

What is claimed is:

1. In a ball lock punch retainer system, including:

a punch, with a ball receiving grooved seat therein, a punch retainer body having a top face and a passage holding said punch, a backing plate attached on the top face of said punch retainer body, a retainer surface adjacent to the backing plate, a spring hole located in the retainer body, a ball positioned within said spring hole to form a ball lock, a spring located in said spring hole, said spring generally acting to bias said ball into a locking engagement with said punch, an access-lock release hole located in the retainer body and communicating with the ball located in the spring hole, the improvement comprising, an elongated gage member movably positioned within said access hole, one end of said gage member having a ball contact surface thereon, said gage member having an indicating area thereon with an upper end, a middle part, and a lower end, and the gage member being operative to determine when the ball lock is in proper position relative to said retainer surface adjacent to the backing plate, such that when the middle part of said indicating area is visible next to a reference surface when said contact surface makes first touch with the ball, this indicates the ball lock is properly positioned, whereas if the upper end of said indicating area is visible beneath said reference surface when said first touch occurs, this indicates the ball lock is too low, and whereas if the lower end of said indicating area is submerged or hidden from view in the access hole when said first touch occurs, this indicates the ball lock is too high.

2. A ball lock punch retainer system, including:

a punch, with a ball receiving grooved seat therein, a punch retainer body having a top face and a passage holding said punch, a backing plate attached on the top face of said punch retainer body, a spring hole located in the retainer body, a ball positioned within said spring hole to from a ball lock, a spring located in said spring hole, said spring generally acting to bias said ball into a locking engagement with said punch, an access hole located in the retainer body and communicating with the ball located in the spring hole, an elongated gage member movably positioned within said access hole, one end of said gage member having a ball contact surface thereon, said gage member having an indicating area thereon with an upper end, a middle part, and a lower end, and the gage member being operative to determine when the ball lock is in proper position.

3. A method of using a gage member to determine whether a ball lock is properly positioned in a punch retainer system which includes, a punch, with a ball receiving grooved seat therein, a punch retainer body having a top face and a passage holding said punch, a backing plate attached on the top face of said punch retainer body, a spring hole located in the retainer body, a ball positioned within said spring hole, a spring located in said spring hole to form a ball lock, said spring generally acting to bias said ball into a locking engagement with said punch, an access hole located in the retainer body and communicating with the ball located in the spring hole, the improvement comprising, an elongated gage member which can be moved into and out of said access hole, one end of said gage member having a ball contact surface thereon, said gage member having an indicating area thereon with an upper end, a middle part, and a lower end, and the gage member being operative to determine when the ball lock is in proper position relative to the punch, such that when the middle part of said indicating area is visible when said contact surface makes first touch with the ball, this indicates the ball lock is properly positioned, whereas if the upper end of said indicating area is visible when said first touch occurs, this indicates the ball lock is too low, and whereas if the lower end of said indicating area is submerged or hidden from view in the access hole when said first touch occurs, this indicates the ball lock is too high, said method comprising:

(1) inserting the gage member into said access hole until it makes first touch with said ball, (2) viewing said gage member after it is so inserted to ascertain whether the ball lock is too low, too high, or is properly positioned.

4. A method of using a gage member to determine whether a ball lock is properly positioned in a punch retainer system which includes, a punch, with a ball receiving grooved seat therein, a punch retainer body having a top face and a passage holding said punch, a backing plate attached on the top face of said punch retainer body, a spring hole located in the retainer body, a ball positioned within said spring hole to form a ball lock, a spring located in said spring hole, said spring generally acting to bias said ball into a locking engagement with said punch, an access hole located in the retainer body and communicating with the ball located in the spring hole, an elongated gage member which can be moved into and out of said access hole, one end of said gage member having a ball contact surface thereon, said gage member having an indicating area thereon with an upper end, a middle part, and a lower end, and the gage member being operative to determine when the ball lock is in proper position, said method comprising:

(1) inserting the gage member into said access hole until it makes first touch with said ball, (2) viewing said gage member after it is so inserted to ascertain whether the ball lock is too low, too high, or is properly positioned.

* * * * *